(12) United States Patent
Fredrickson

(10) Patent No.: US 10,753,789 B2
(45) Date of Patent: Aug. 25, 2020

(54) WEIGHT SENSING VEHICLE HITCH

(71) Applicant: R. Douglas Fredrickson, St. Cloud, MN (US)

(72) Inventor: R. Douglas Fredrickson, St. Cloud, MN (US)

(*) Notice: Subject to any disclaimer, the term of this patent is extended or adjusted under 35 U.S.C. 154(b) by 0 days.

(21) Appl. No.: 16/226,981

(22) Filed: Dec. 20, 2018

(65) Prior Publication Data
US 2019/0162584 A1 May 30, 2019

Related U.S. Application Data

(63) Continuation-in-part of application No. 15/016,867, filed on Feb. 5, 2016, now Pat. No. 10,309,824.

(60) Provisional application No. 62/112,440, filed on Feb. 5, 2015.

(51) Int. Cl.
G01G 19/12 (2006.01)
B60D 1/06 (2006.01)
B60D 1/24 (2006.01)
B60D 1/62 (2006.01)

(52) U.S. Cl.
CPC ............ G01G 19/12 (2013.01); B60D 1/06 (2013.01); B60D 1/248 (2013.01); B60D 1/62 (2013.01)

(58) Field of Classification Search
CPC .......... G01G 19/08; G01G 19/12; B60D 1/06; B60D 1/248; G01L 5/136
See application file for complete search history.

(56) References Cited

U.S. PATENT DOCUMENTS

| 3,700,053 | A | 10/1972 | Glissendorf |
| 4,319,766 | A | 3/1982 | Corteg et al. |
| 4,432,247 | A | 2/1984 | Takeno et al. |
| 4,630,491 | A | 12/1986 | Kitagawa et al. |
| 4,864,874 | A | 9/1989 | Hafner |
| 5,149,121 | A | 9/1992 | Hafner |
| 7,215,870 | B2 | 5/2007 | Liebart et al. |
| 2006/0290102 | A1 | 12/2006 | VanBuskirk, Jr. |
| 2010/0065344 | A1 | 3/2010 | Collings, III |
| 2012/0024081 | A1 | 2/2012 | Baker |
| 2013/0253814 | A1 | 9/2013 | Wirthlin |
| 2014/0110918 | A1 | 4/2014 | McCoy |
| 2014/0327229 | A1 | 11/2014 | Scharf |
| 2015/0069737 | A1 | 3/2015 | McAllister |
| 2016/0185170 | A1 | 6/2016 | McAllister |
| 2019/0070915 | A1 | 3/2019 | Gentner et al. |

FOREIGN PATENT DOCUMENTS

EP 2452839 A 5/2012

Primary Examiner — Natalie Huls
(74) Attorney, Agent, or Firm — Vidas Arrett & Steinkraus P.A.

(57) ABSTRACT

A weight sensing vehicle hitch allows an operator to easily determine the load placed on the vehicle. The load sensor is permanently installed in the hitch. The weight sensing vehicle hitch has a hitch receiver tube and a load sensor connected to an actuator which has two positions, a first position in which the actuator and load sensor is not in contact with a bottom of the ball support and a second position in which the actuator and load sensor is raised into contact with the bottom of the ball support, using an actuator slide.

6 Claims, 16 Drawing Sheets

WEIGHT SENSING VEHICLE HITCH

CROSS-REFERENCE TO RELATED APPLICATIONS

This application is a continuation-in-part of application Ser. No. 15/016,867, filed on Feb. 5, 2016, which was a conversion from U.S. Provisional Application No. 62/112,440 filed on Feb. 5, 2015, the entire contents of both of which are hereby incorporated by reference.

STATEMENT REGARDING FEDERALLY SPONSORED RESEARCH

Not Applicable.

BACKGROUND OF THE INVENTION

This invention relates to vehicle hitches and in particular to hitches that includes a sensor to provide the user with information on the load applied to the hitch.

Towing a trailer behind a vehicle may be dangerous if the weight of the trailer is improperly balanced or exceeds the intended design of the vehicle. Exceeding the rated towing capacity of a vehicle can result in a very dangerous driving condition in addition to potential damage to the vehicle. For instance, dangerous trailer sway can occur by loading a trailer such that the proper proportions of "tongue weight" to gross weight are not achieved.

However, current technology does not provide an easy or convenient mechanism for measuring the tongue weight of a trailer. In fact, the almost-universally suggested method for measuring the tongue weight of a loaded trailer involves the use of a conventional bathroom scale, a brick, and a piece of wood. Such an awkward and inconvenient method of measuring the tongue weight of a trailer is, unfortunately, the state of the art.

SUMMARY OF THE INVENTION

The invention is directed at the receiver unit which is inserted into the vehicle's receiver hitch assembly. The invention includes a load force sensing assembly to be placed beneath the receiver unit. The integral load sensor in the load force sensing assembly detects a force exerted on the receiver unit from the apparent weight of the tongue of a trailer placed on a trailer ball attached to the receiver unit.

In one aspect, the invention enables an apparatus comprising a load force sensing assembly adapted to sense a force exerted by the receiver unit resting in the vehicle's receiver hitch. The load force sensing assembly; and a signal component coupled to the load force sensing assembly and configured to output a signal substantially corresponding to the force.

In another aspect, the invention enables a sensor operative to detect a downward force imparted on a trailer hitch to which the trailer is attached while a trailer is coupled to the trailer ball and to convey the downward force through the receiver to a display mechanism.

In yet another aspect, the invention enables an apparatus for displaying the tongue weight of a trailer comprising a display having a coupling that is operative to couple to a trailer, the display being configured to output an indication of a tongue weight of a trailer while the trailer is coupled to the trailer ball based on a signal received from the trailer ball using the coupling.

In still another aspect, the invention enables a method for measuring tongue weight. The method includes detecting a downward force exerted by a trailer tongue on a trailer hitch with the trailer tongue coupled to the trailer hitch and outputting a signal that corresponds, at least in part, to the downward force.

Advantageously, embodiments of the invention enable a user to inspect the tongue weight of a trailer while the trailer is coupled to the trailer ball and without having to decouple the trailer from the trailer ball. In addition, weight can be redistributed on the trailer without decoupling the trailer from the trailer ball to achieve a desired tongue weight, which greatly simplifies the task of loading a trailer that is safe to tow.

In another embodiment of the invention, the load sensor is permanently installed in the hitch. In this embodiment the weight sensing vehicle hitch has a hitch receiver tube and a load sensor connected to an actuator which has two positions. A first position in which the load sensor and contact block are raised above the level of the floor of the hitch tube, so they contact the bottom of the ball support, and a second position in which the sensor and contact block are lowered below the level of the floor of the hitch tube, and out of contact with the bottom of the ball support.

The actuator slide is tapered so sliding the actuator slide from the first position to the second position raises the load sensor and contact block into contact with the bottom of the ball support, so that a ball mount can load the sensor when the ball mount is loaded.

This embodiment also includes a mechanism to connect the load sensor to a source of electrical power, a computational assembly for determining the weight applied to said load sensor, and a mechanism to display the weight sensed by the load sensor.

Power is provided to the load sensor using a wiring adapter to fit a standard trailer connector on a vehicle.

The user can utilize the weight sensing feature on all past and current configurations of receiver tube/ball mount hitches the user may already possess. The sensor's unique "quick calibration feature" compensates for any dimensional differences between various hitch manufacture's devices.

BRIEF DESCRIPTION OF THE SEVERAL VIEWS OF THE DRAWING(S)

Figure 8:
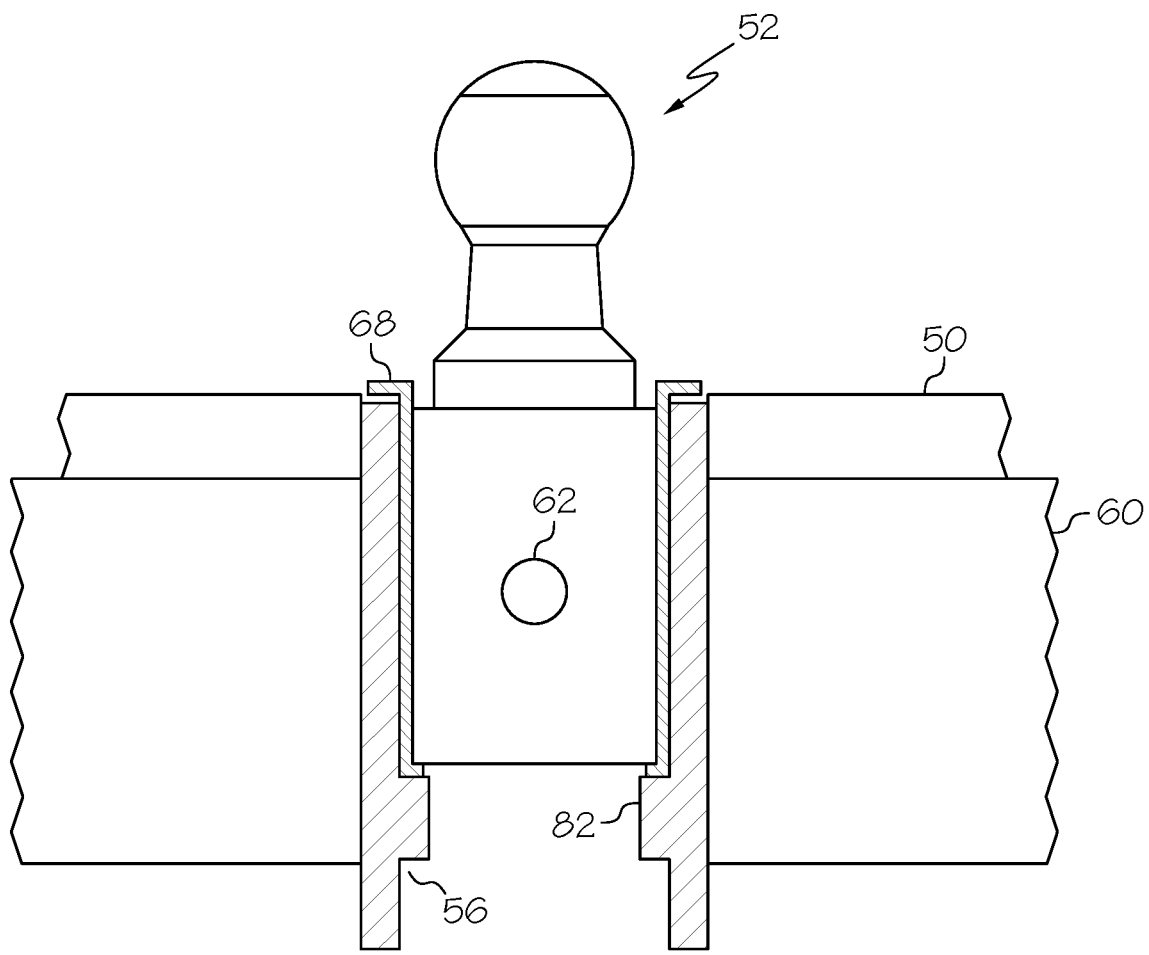
Figure 9:
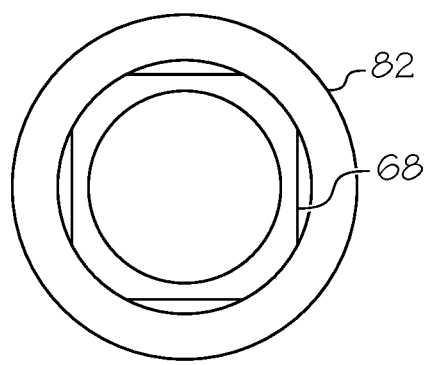
Figure 10:
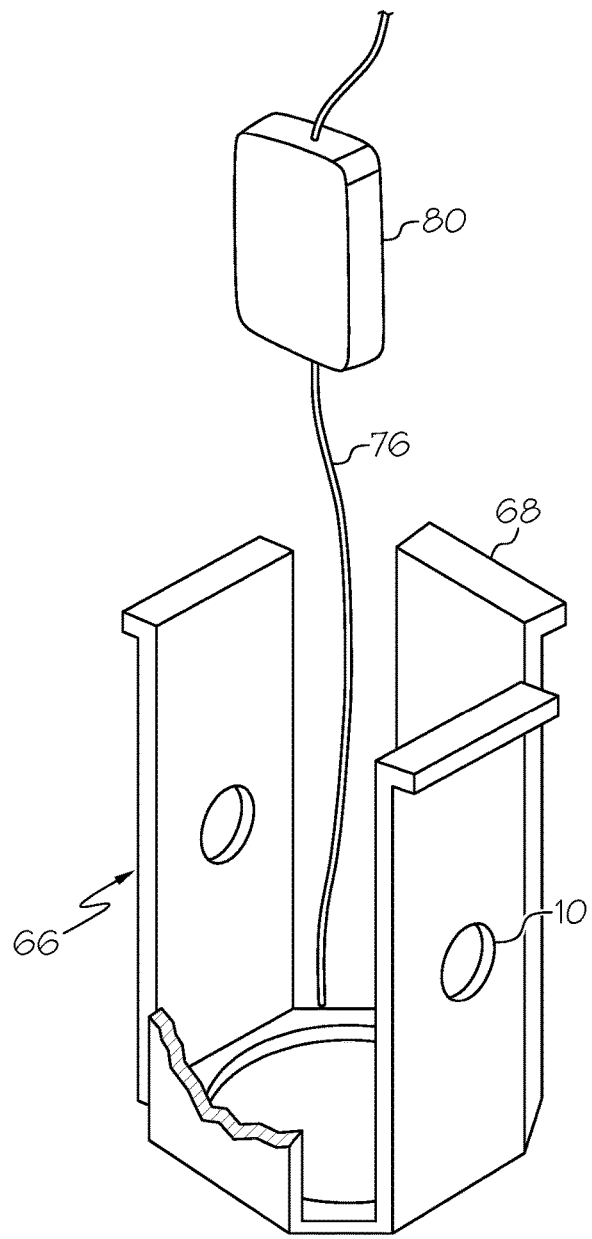
Figure 11:
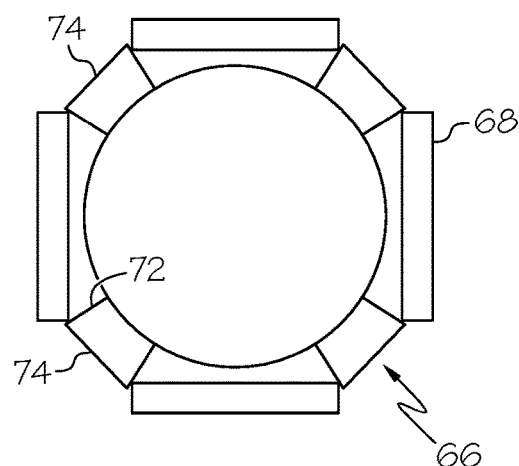
Figure 12:
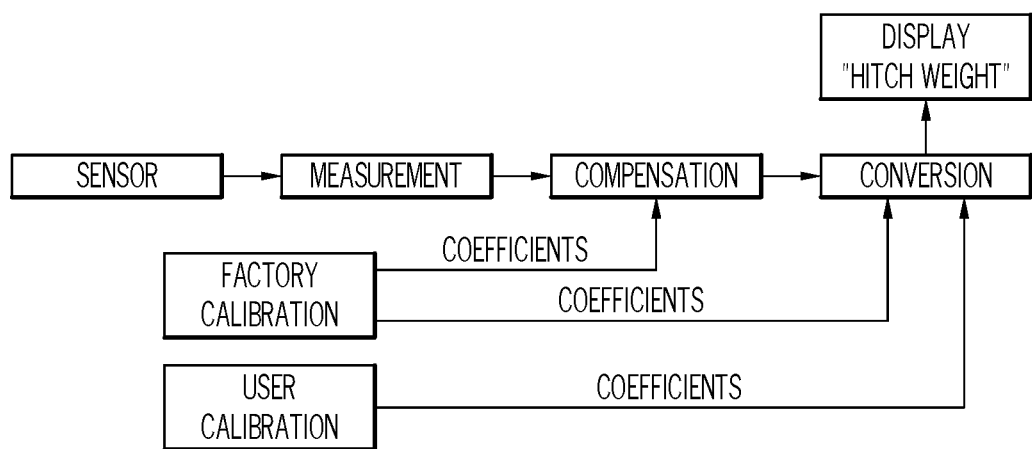
Figure 13:
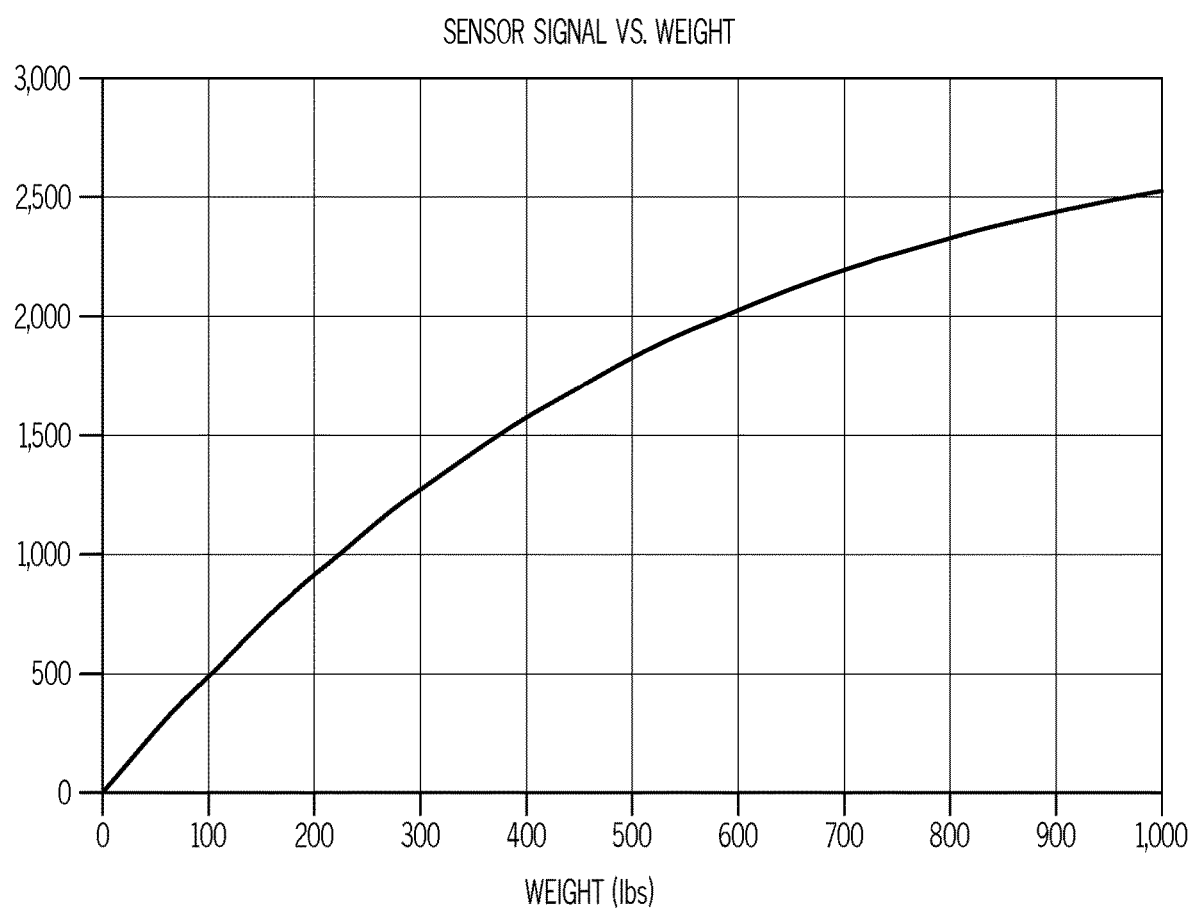

FIG. 8 shows a side view of an alternative embodiment with a gooseneck trailer configuration, FIG. 9 shows a top view of a the gooseneck trailer configuration of FIG. 8, FIG. 10 shows the load force assembly of FIG. 8, FIG. 11 shows the load force assembly of FIG. 9 in a top view, FIG. 12 shows a diagram of the calibration scheme for the sensors, FIG. 13 is a graph showing the sensor signal to weight.

Figure 14:
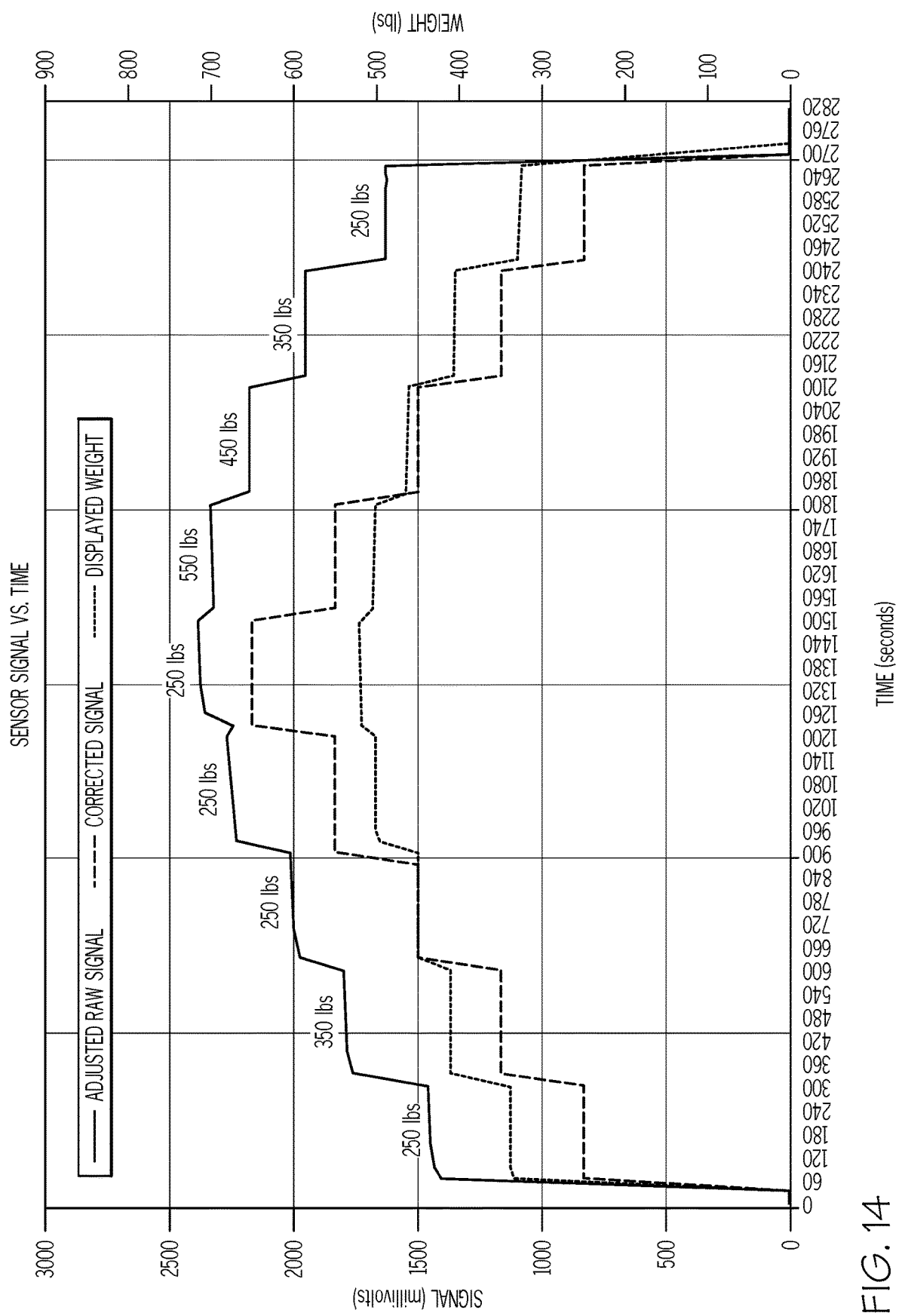
Figure 15:
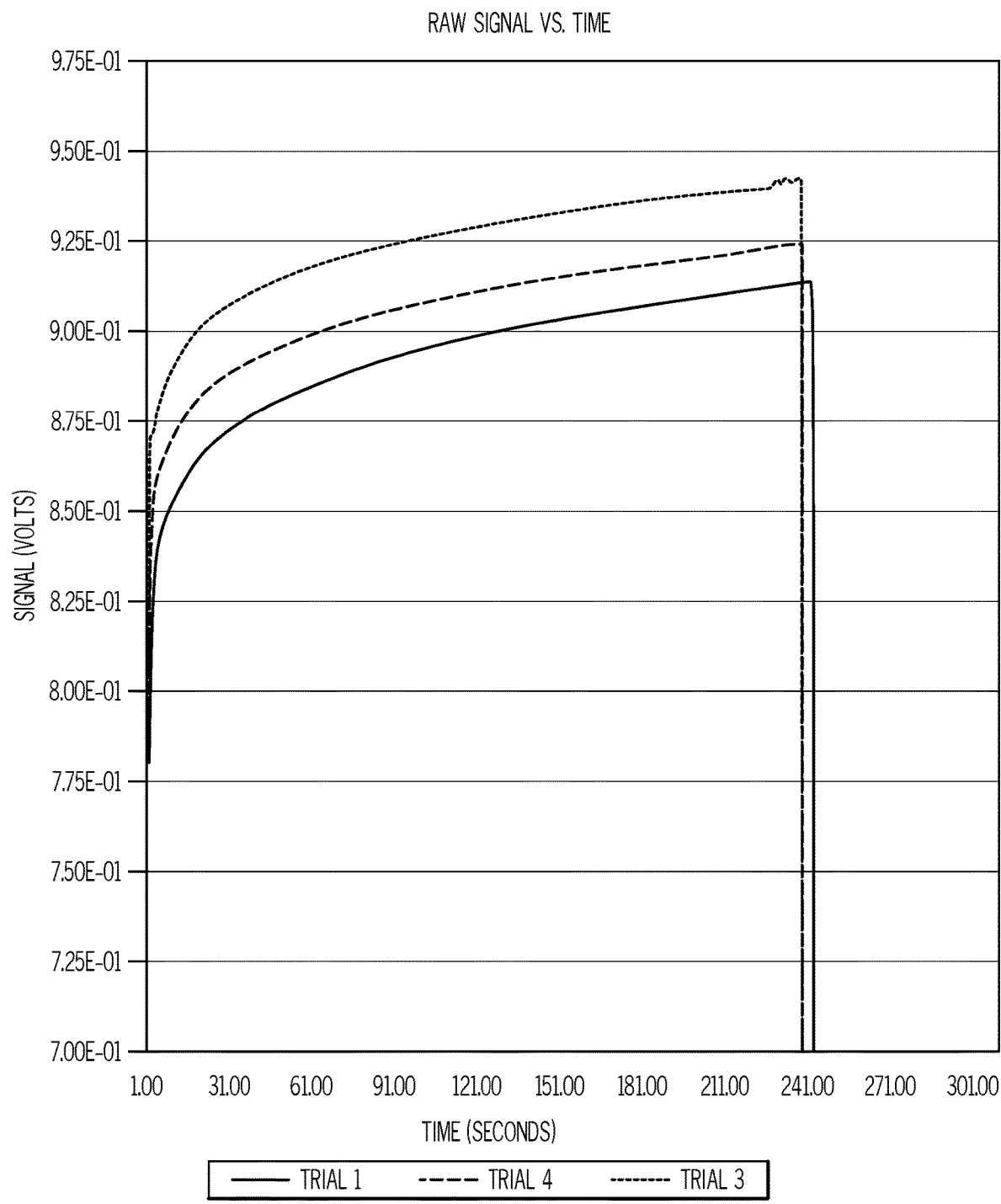

FIG. 14 is a graph showing the raw signal versus corrected signal with varied weights, and FIG. 15 is a graph showing the sensor signal versus time at constant weights.

Figure 16:
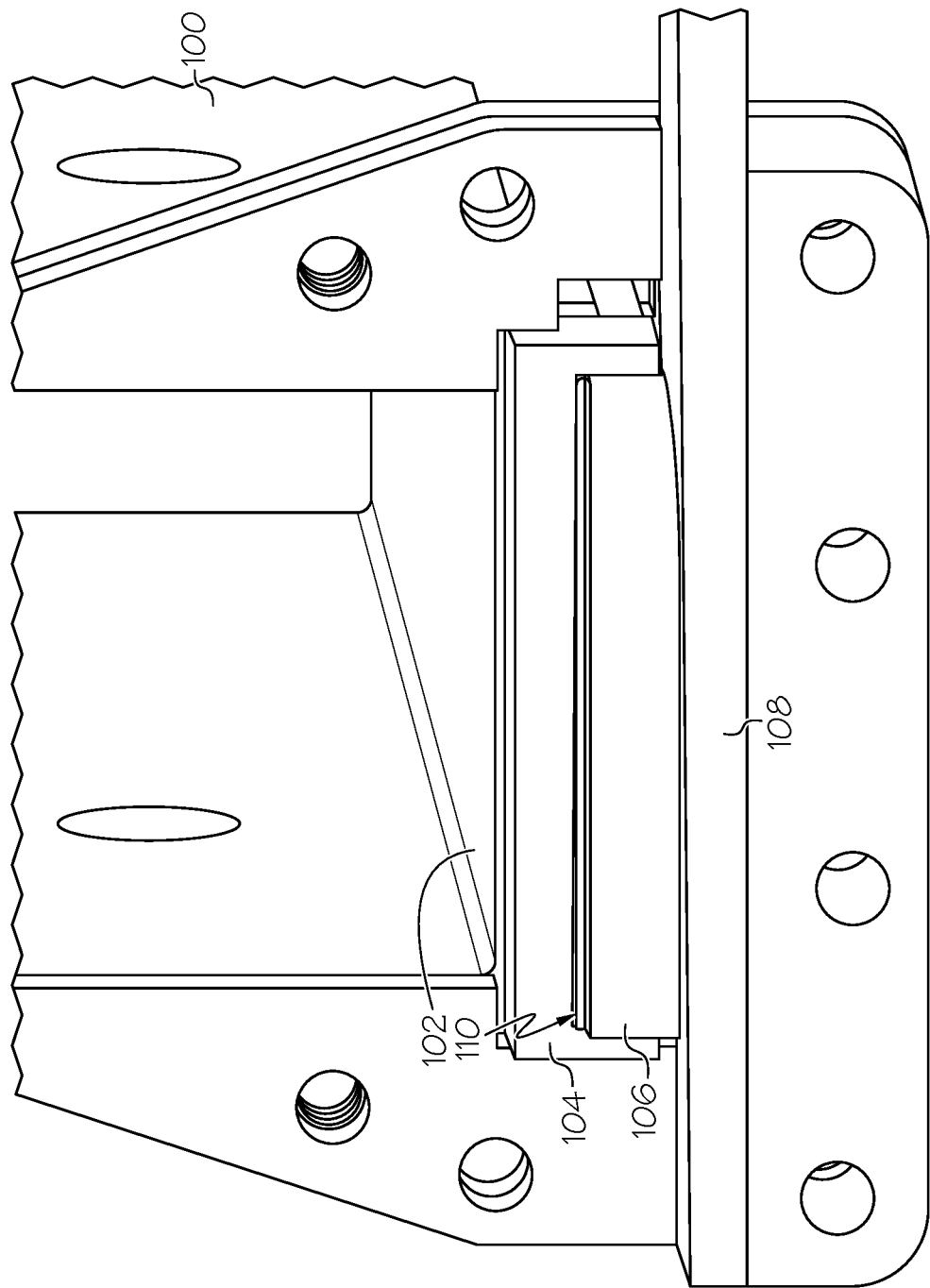

FIG. 16 shows another embodiment of the weight sensing vehicle hitch in a first unengaged position.

Figure 17:
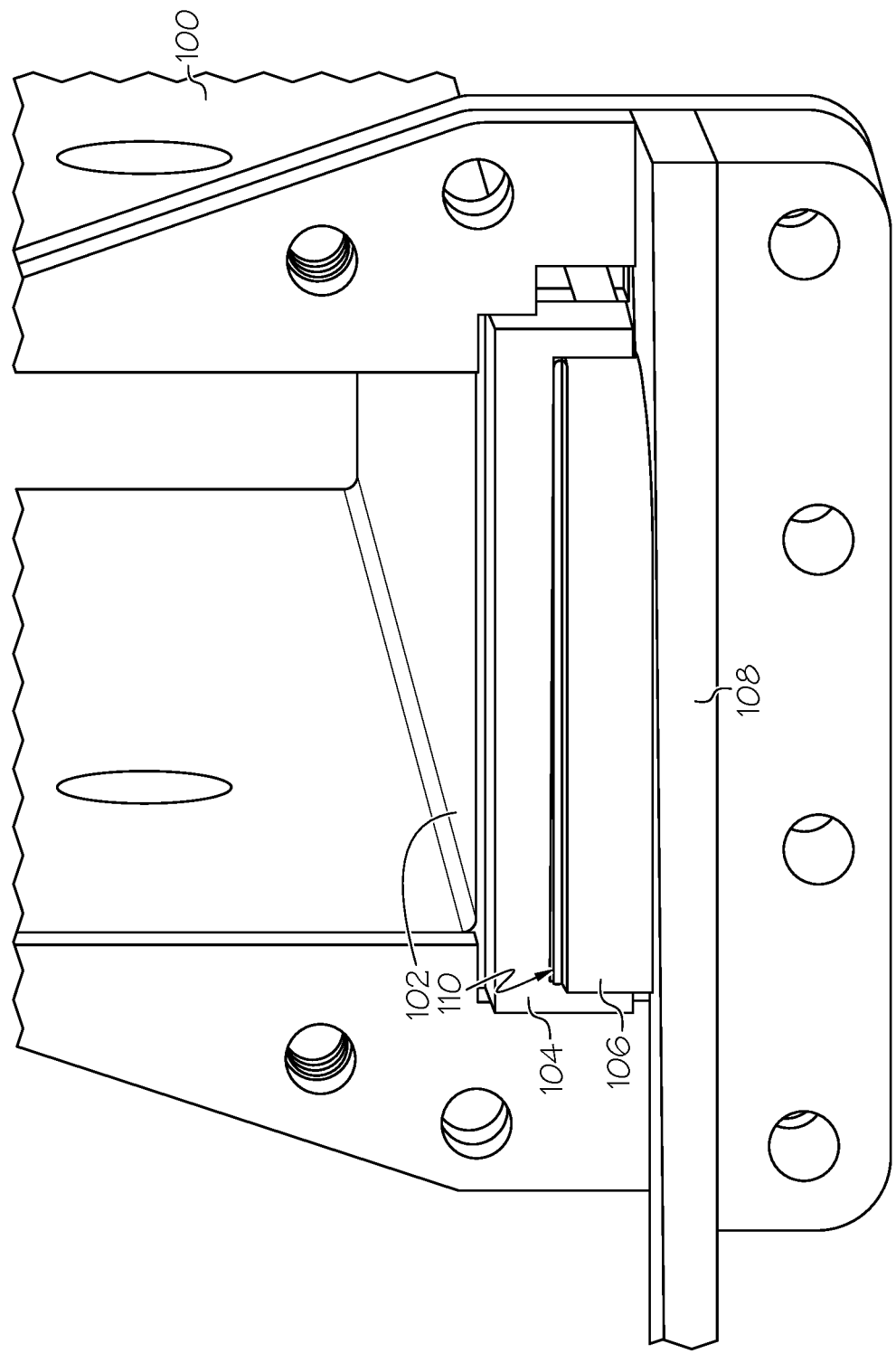

FIG. 17 shows the embodiment of FIG. 16 in the engaged position.

Figure 18:
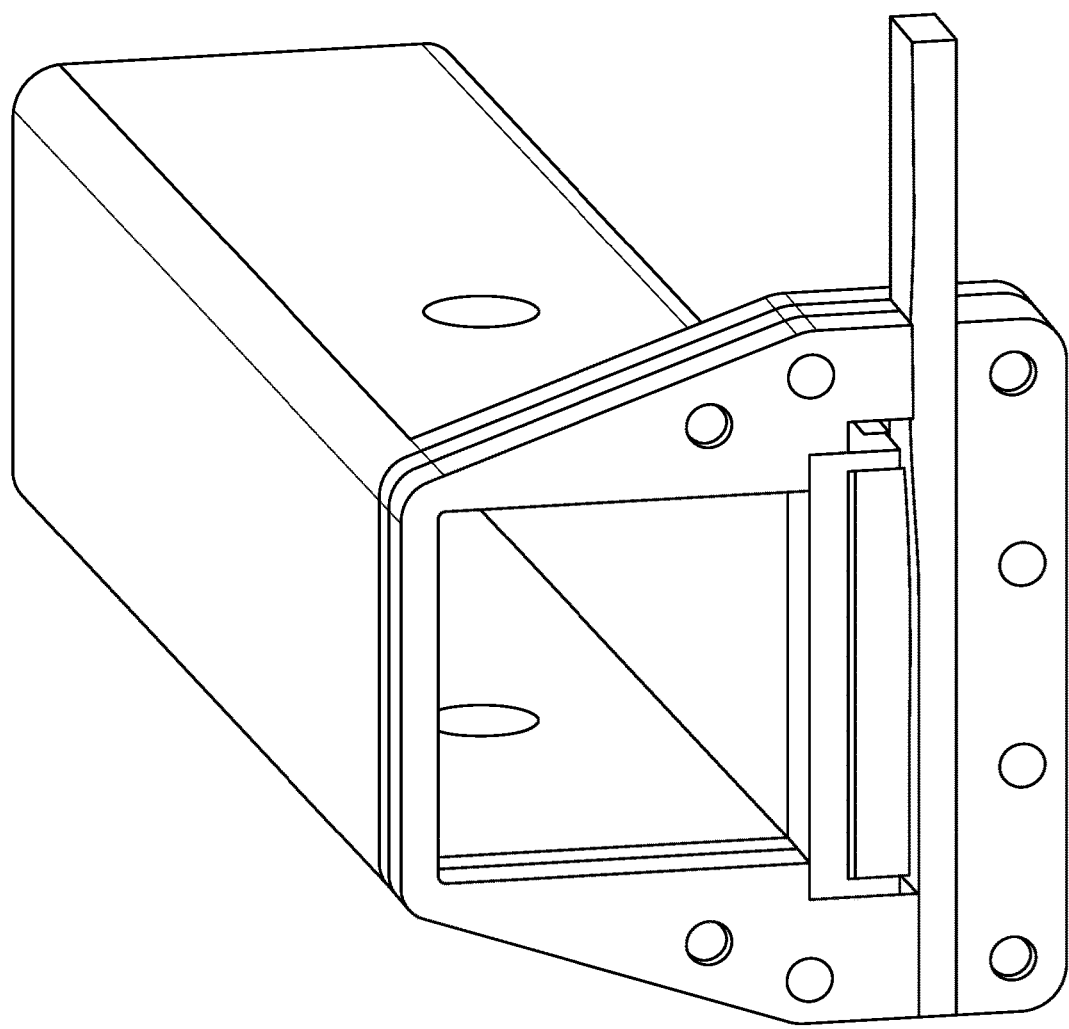

FIG. 18 shows another view of the embodiment of FIG. 16 in the unengaged position.

Figure 19:
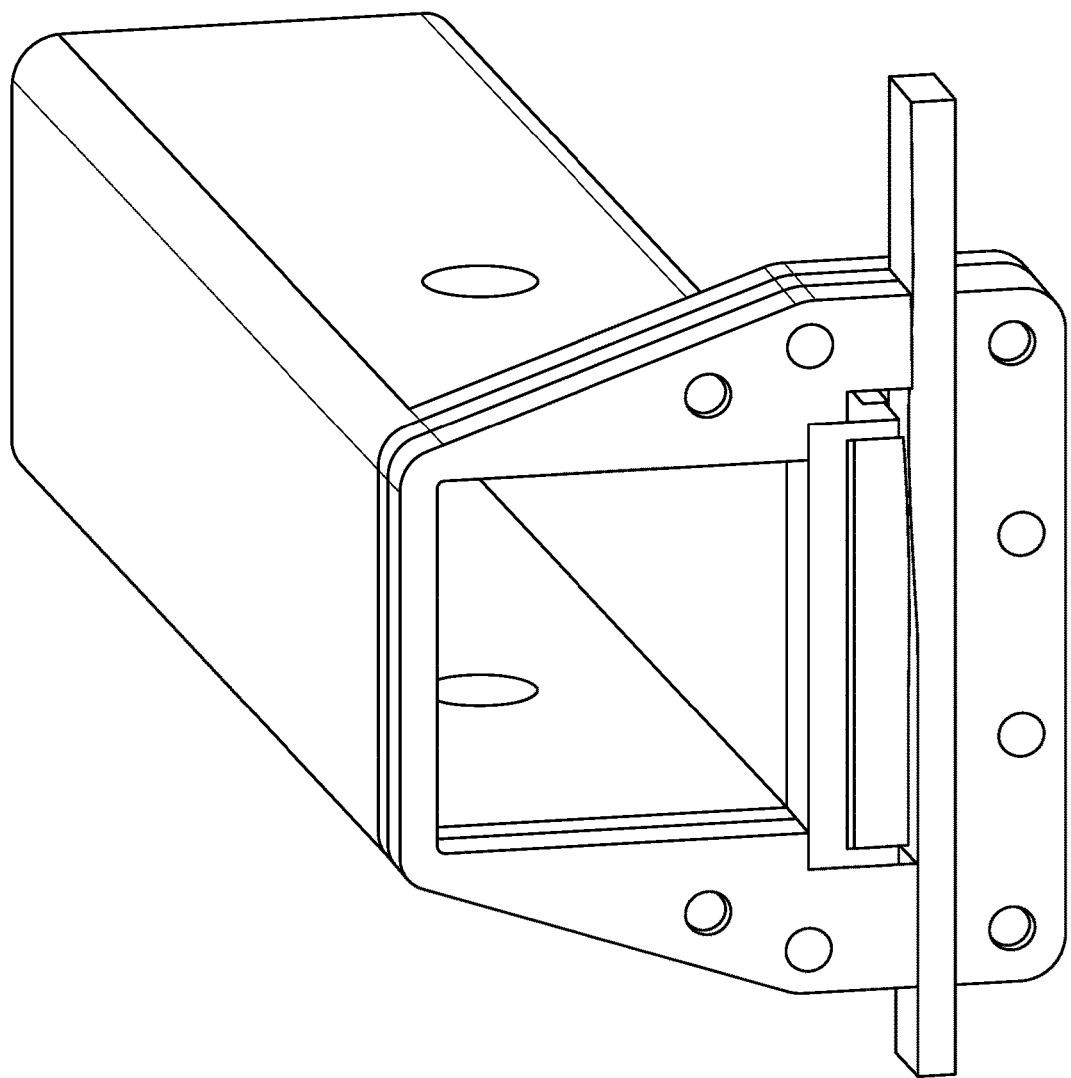

FIG. 19 shows the view of FIG. 18 in a middle position, between the engaged and unengaged position.

Figure 20:
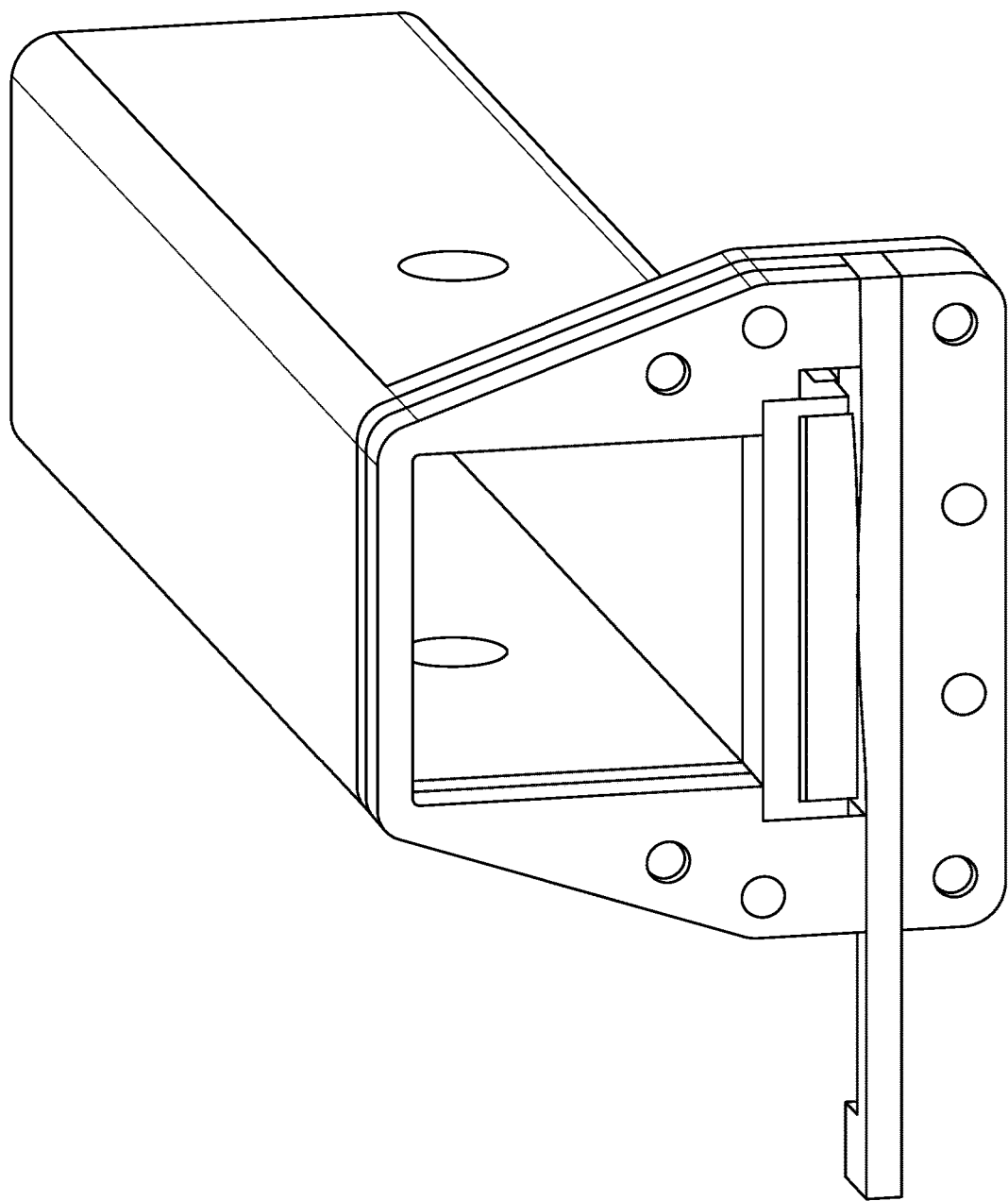

FIG. 20 shows the view of FIG. 18 in the fully engaged position.

DETAILED DESCRIPTION OF THE INVENTION

Figure 1:
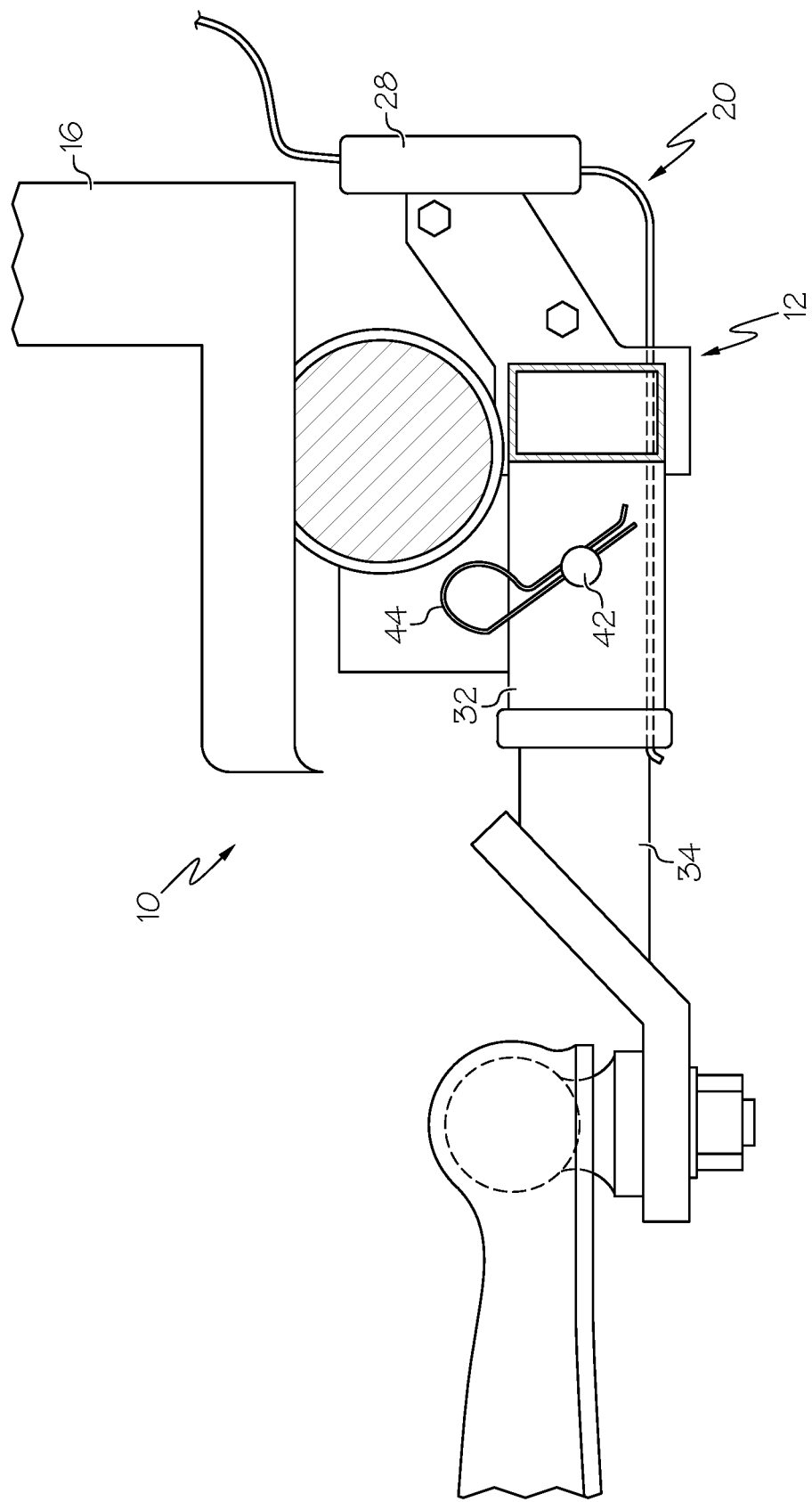
FIG. 1 shows a side view of a weight sensing vehicle hitch, vehicle bumper, and coupler.

FIG. 1 shows a side view of a hitch assembly 10 comprising a hitch receiver 12 attached to vehicle chassis 16. The hitch assembly 10 further includes a load force assembly 20. In some embodiments, the load force assembly 20 comprises at least one load sensor 22 (see FIGS. 3 and 4), a first layer of protective material 24, and a second layer of protective material 26. The at least one load sensor 22 is sandwiched between the first layer of protective material 24 and the second layer of protective material 26. The at least one load sensor 22 is attached to a computational assembly 28 that interprets the output from the at least one load sensor 22 and outputs the information so that it can be displayed to the operator. The computational assembly 28 may be powered via the vehicle's power supply (not shown), such as a 12V system, for example with connector 30. FIG. 1 shows the ball mount 34 slid into the hitch receiver tube 32 (also referred to herein as a ball support) which is locked together by a pin through matching holes and secured with a hitch pin 42 and hairpin cotter 44.

Power for the computational assembly 28 can be provided with a hardwired connection to the vehicle's OEM (original equipment manufacturer) wiring harness or via a plug-in connection into the vehicle's electrical system, for example located at the rear of the vehicle; power can also be provided to the computational assembly 28 using an internal power supply, such as a battery, which may be rechargeable, disposable, or of any other suitable variety.

Figure 5:
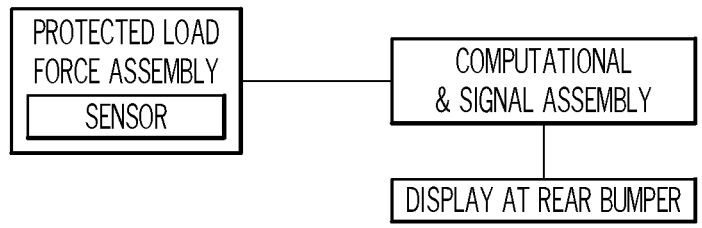
FIG. 5 shows a diagrammatic view of an embodiment of the invention.
Figure 6:
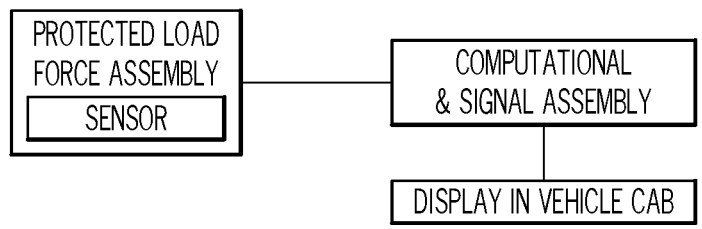
FIG. 6 shows a diagrammatic view of an embodiment of the invention.
Figure 7:
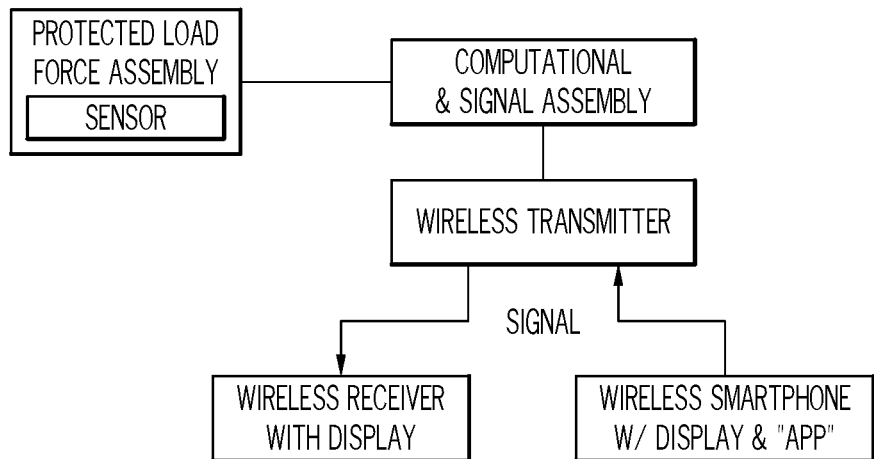
FIG. 7 shows a diagrammatic view of an embodiment of the invention.

A readout from the at least one load sensor 22, for example via the computation assembly 28, is provided to the operator so that the operator can determine how much load (weight) is placed on the hitch receiver 12 in real time. The readout can be provided to the operator in a variety of ways. For example, as illustrated in FIGS. 5 and 6, the operator can have a display in the cab of the vehicle and/or on the rear of the vehicle (e.g., bumper mount). In some embodiments, for example as shown in FIG. 7, the load information can be sent to the operator's cellular phone (e.g., smart phone), or other device, for example via WiFi, Bluetooth, or other wireless or wired interface. In some embodiments, a vehicle's OEM display is utilized to display the load information. Any other suitable display can be utilized.

Figure 2:
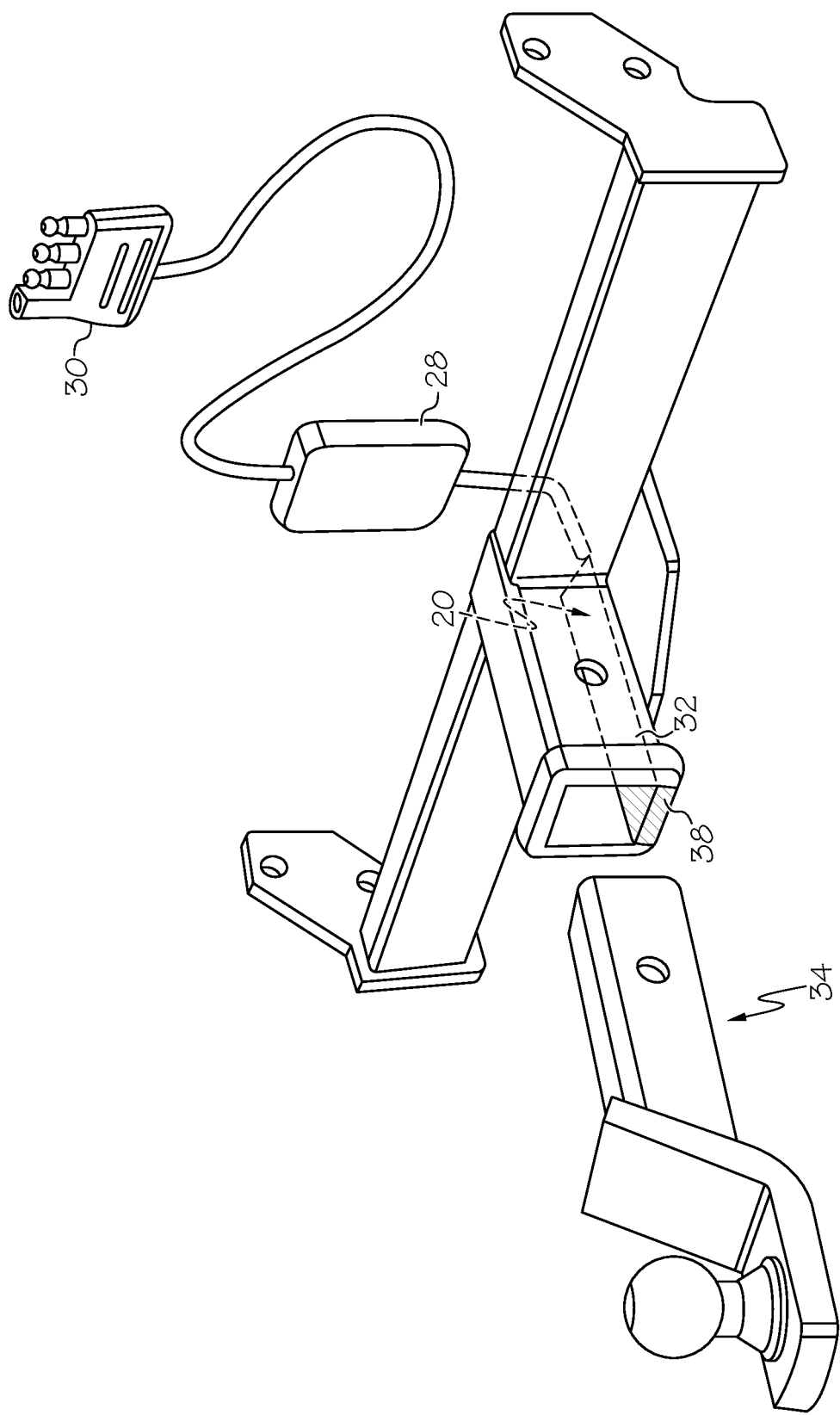
FIG. 2 shows a detailed view of a hitch receiver and load force assembly.

As show in FIG. 2, in some embodiments, the second layer of protective material 26 of the load force assembly 20 rests on an interior surface of the hitch receiver tube 32. The ball mount 34 (FIG. 1) rests on top of the first layer of protective material 24 so that the tongue load of the trailer can be measured with the load sensor 22, which is disposed between the first layer of protective material 24 and the second layer of protective material 26.

Figure 3:
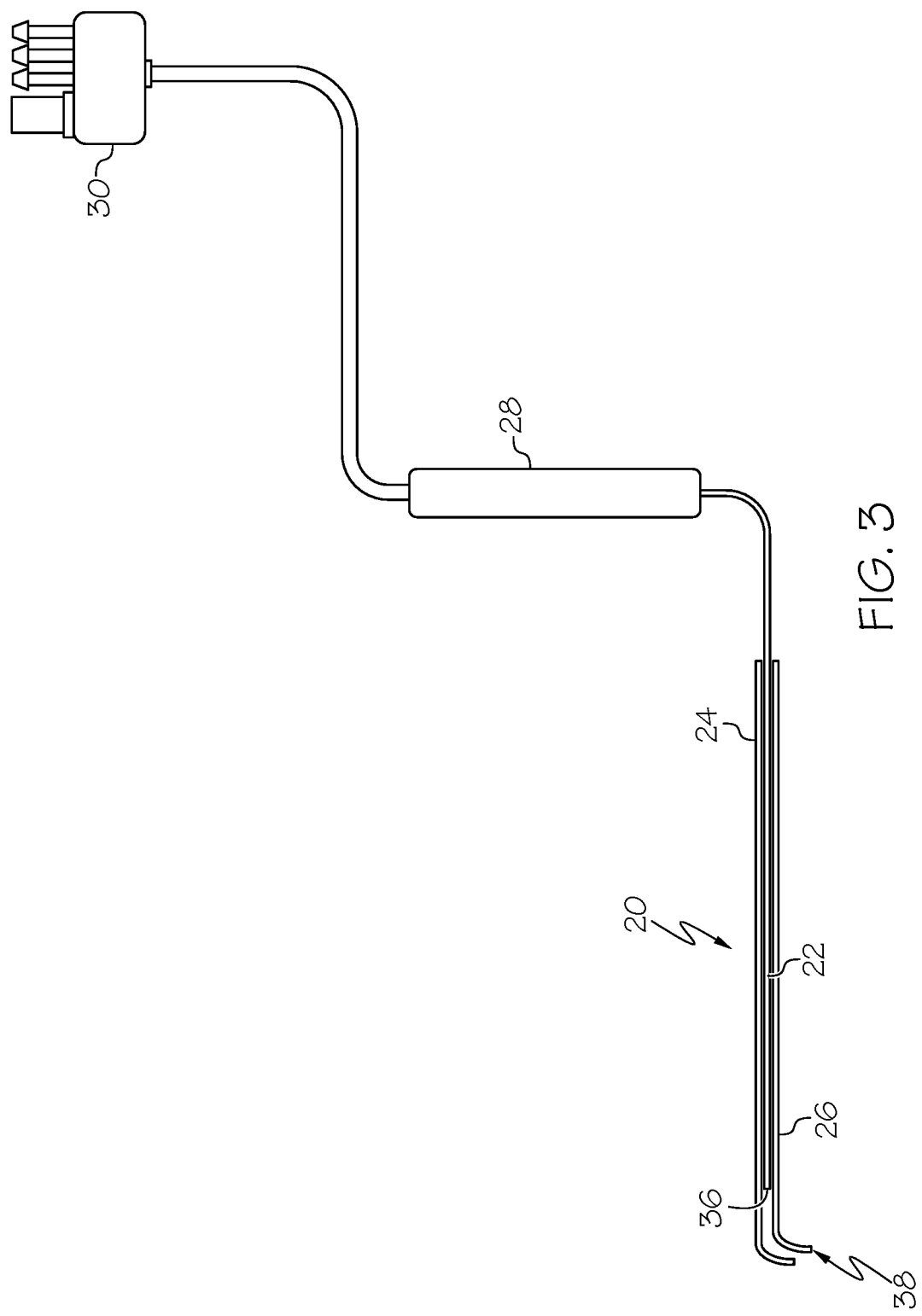
FIG. 3 shows a side view of a load force assembly.

In some embodiments, the first layer of protective material 24 and the second layer of protective material 26 extent beyond the distal end 36 of the load sensor 22, as shown in FIG. 3, for example. As further shown in FIG. 3, the first layer of protective material 24 and the second layer of protective material 26 are curved downwardly at their distal ends so that the ball mount 34 can slide easily into the hitch receiver tube 32 and not catch on the distal end of the layers of protective material 24, 26. The downward curve also serves an important function of ensuring the exact positioning in relationship to the front of the hitch tube of the load sensing portion 40. In some embodiments, the total thickness of the load sensor 22, first layer of protective material 24, and second layer of protective material 26, is 0.05". This allows the ball mount 34 to slide easily into the hitch receiver tube 32. Additionally, in some embodiments, the distance between the top surface of the first layer of protective material 24 and the lower lip 38 of the second layer of protective material 26 is ½." The sensor assembly may also be designed to be used in a temporary placement manner. This version would have the power cord lead from the load sensor 40 coming out the front of the tube instead of the back. It would incorporate the functions of proper sensor positioning (mentioned above w/ curve), protective covering of the connection point between the light sensor material and the heavier durable power cord to the computational assembly and facilitate the extraction of the assembly from the hitch tube.

Figure 4:
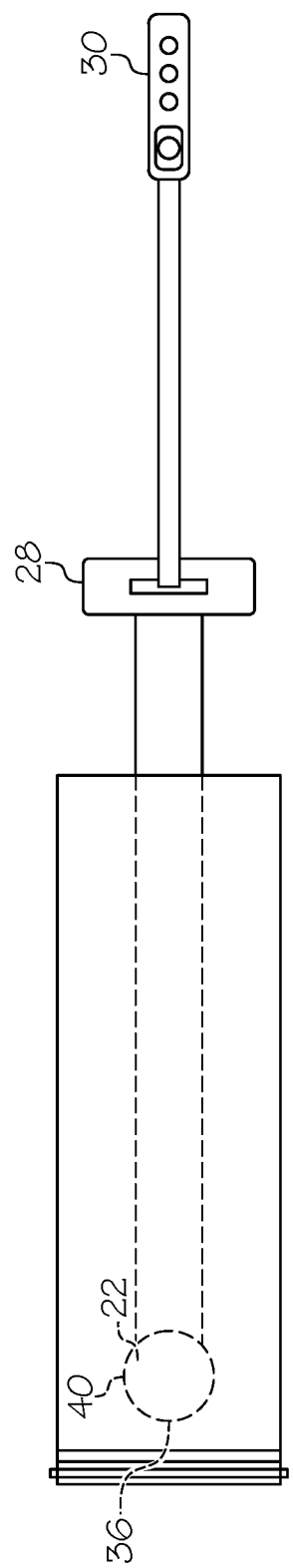
FIG. 4 shows a top view of a hitch receiver and load force assembly.

With regard to FIG. 4, in some embodiments, one or both of the first layer of protective material 24 and the second layer of protective material 26 are 6¼" in length, though other lengths are permissible. For example, depending upon the characteristics of the receiver tube 32 and load sensor 22, for example, a length of between 3" and 10" may be used. In some embodiments, the load sensing portion 40 of the load sensor 22 is located 1" from the distal end of the hitch receiver tube 32. In some embodiments, the center of the load sensing portion 40 is located 1" from the distal end of the hitch receiver tube 32. The load sensing portion 40 can further be located in any desirable location along the length of the hitch receiver tube 32 (and relative to the first and second layers of protective material 24, 26), depending upon the hitch receiver 12 set-up.

The invention is also useful in gooseneck trailer configurations which utilize a "turnover ball" hitch mechanism. In such applications a hitch weight sensing device may be added to obtain the benefits discussed above. Gooseneck hitches such as shown in U.S. Pat. Nos. 6,447,000; 7,775,545, the disclosures of which are incorporated herein by reference, are mounted to the bed of a pickup truck and often allow the hitch ball to be lowered below the floor of the truck to permit full use of the bed of the truck.

In typical "gooseneck" hitches, the truck bed surface 50 has an opening through which a turnover ball 52 may be inserted. While the turnover ball 52 could simply be threaded into the truck bed, it is more typically inserted into an opening 56 formed in the truck bed frame 60. In many arrangements, the frame is an added on unit mounted underneath the truck bed. In any event, the turnover ball 52 is inserted into the formed opening 60 and is typically secured with a pin (not shown) through a side opening 62 in the turnover ball and through the truck frame. This secures the turnover ball 52 from being removed unless intended. The opening 56 may include a load force assembly 66 which is inserted into the opening and held in place by upper limiting tabs 68 or the like. An opening 70 is formed for the pin to pass there through when secured to the turnover ball side opening 62.

At the bottom 72 of the load force assembly a load sensor 74 is positioned. It may be protected by layers of protective material on one or both sides as discussed previously. Appropriate wiring 76 carries the signal to a computational assembly 80 for processing which is then transmitted via an OEM wire harness, Bluetooth, Wi-Fi or other means to be displayed in the vehicle with an in-cab display, phone screen or separate display. The load force assembly 66 is placed beneath the removable "turnover" ball on the weight bearing surface of the retention mechanism 82 designed to secure the turnover ball 52.

The retention mechanism 82 is attached to the frame of the vehicle.

Trailer loads transmitted through the Gooseneck trailer configuration to the turnover ball mechanism in the vehicle will be measured and communicated to the user Load Force Assembly 66:
- Picks-up the total load force traveling through the turnover ball 52 down to the retention mechanism 82.
- Up to four active force sensing areas that may be spaced equally around the perimeter of the load force assembly 66 are in the configuration as shown in FIGS. 10 and 11.
- The four load force sensing areas of the load force assembly 66 send information to a computational assembly 80.

Power may be provided to the "computational assembly" from the vehicle's electrical system in four ways:
1. Hardwire into the vehicle's OEM wire harness.
2. From either of the vehicles plug-ins located near or in the rear bumper specifically designed for providing electrical power to trailers.
3. Plugging into the trailer's power supply.
4. Battery located in the device's system.

The computational assembly 80 that provides the means to determine loads transmitted from the load force sensors 74 and send them to various users' locations. i.e. drivers cab, rear bumper, or to a person operating an independent piece of equipment loading the trailer. It can be transmitted via either OEM wire harness, Bluetooth, Wi-Fi, or other electronic means. These signal can be displayed electronically on the vehicle's OEM in-cab-display, Smart phone screen, or separate display specifically designed for use with the invention. All means allow the user to view the actual load on the trailer hitch in real-time.

Load Force Assembly Method 1:
- Consists of durable material sufficient to secure the load force sensor in proper the position under the "turnover ball" while in use, also when not in use and the turnover ball is in a stored position, or if the "turnover ball" is removed completely from the retention mechanism 82.
- The load sensing electronic components of the hitch weight sensing device are secured to the "base portion" of the load force assembly 66. The turnover ball 52 rests directly above the load sensors 74.
- The entire load force assembly 66 can be removed in the same manner as the turnover ball 52 by retracting the ball retention pin from the assembly.

Load Force Assembly Method 2:
- Consists only of the "base portion" with the load sensing electronic components secured to it. In this form, the load sensors 74 are simply adhered or otherwise affixed to the bottom of the retention mechanism 82.

In some embodiments, the first and second layers of protective material 24, 26 are made from a metallic material, for example sheet steel or stainless steel. In some embodiments, the protective material thickness is increased specifically over the load sensor 40 to ensure accurate load force transfer. The first and second layers of protective material 24, 26 are secured to one another along their edges to prevent movement of the load sensor 22 within the load force assembly 20. The first and second layers of protective material 24, 26 can be secured to one another in any suitable way, for example adhesively, rivets, spot welding, welding, etc.

In some embodiments, the first and second layers of protective material 24, 26 are made from a durable fabric material, for example epoxy impregnated Kevlar® brand aramid fiber, fiberglass, or carbon fiber. In some embodiments, the protective material thickness is increased specifically over the load sensor 40 to ensure accurate load force transfer. The first and second layers of protective material 24, 26 are secured to one another along their edges to prevent movement of the load sensor 22 within the load force assembly 20. The first and second layers of protective material 24, 26 can be secured to one another in any suitable way, for example adhesively, thermal set epoxy, etc. One or both of the protective layers of material can further be made from any suitable material or combination of materials, alloys, composites, etc.

In some embodiments, the load force assembly 20 can be used with any class of hitch receiver 12, for example class I & II, III & IV, V, and VI.

In some embodiments, the load force assembly 20 is integrated into the hitch receiver 12. In some embodiments, the load sensor 22 is integrated into the ball mount 34 on its underside. In this way, an existing hitch receiver 12 would not need to be modified since the load sensors 22 can be on the ball mount 34. In some embodiments, the load sensor 22 is located on the inside surface of the hitch receiver tube 32 and a layer of protective material is placed over the load sensor 22 such that the ball mount 34 can be located on top of the layer of protective material.

In some embodiments, the load force assembly 20 can be used as an aftermarket product or with an OEM hitch receiver 12. In some embodiments, the load sensor 22 can be used as an aftermarket product or with an OEM hitch receiver 12.

In some embodiments, the at least one load sensor 22 is a "FlexiForce™" sensor from Tekscan, Inc. of South Boston, Mass. Such sensors are described in U.S. Pat. Nos. 6,272,936 and 7,258,026, the disclosures of which are incorporated herein by reference.

The load sensors 22 provide an output from a load which needs to be converted to a value in pounds or kilograms. There are two main steps for this conversion. Step one is to compensate for the time-drift of the sensor. To do that we averaged several empirical measurements on different sensors to determine a "typical" drift curve. Those curves were taken under constant load, and the values are raw sensor values vs. time. Then we approximated that measured curve with a piecewise linear compensation function. The compensation function is subtracted from the raw sensor value in the smartphone before converting it to a weight.

The compensation function may be a single fixed function of time, representing an average over the sensors and conditions. It may also be a function of both weight and time and instead of being based on a piece-wise linear curve may be a polynomial whose coefficients are dependent on weight.

Next, the drift-compensated sensor value is converted to weight. For the sake of clarity, let's use the terms compensation (to remove time drift), conversion (from compensated signal to weight) and calibration (which generates input to the conversion formula). The need to apply linearization during this conversion step is pretty standard in any sensor measurement. As above, a 3-parameter polynomial may be used to make this conversion, but the coefficients may be measured during production so they are unique for each sensor. The coefficients will reflect the shape of the curve, and they may be scaled or otherwise manipulated to take into account the user calibration.

The computational assembly may do the math itself prior to sending the weight to the smartphone. Conversely, it may be done in an app on the phone so a) the calibration factors do not need to be sent from the phone down to the device, and b) the phone more readily deals with a situation where power is interrupted to the sensor during a measurement.

FIG. 12 shows a block diagram showing a calibration scheme showing that the information from the sensor is sent to the computational assembly (which may be wholly within the device or may use computational power from another device such as a smartphone using an app. The measurement value is then adjusted with compensation data to compare to factory and user calibrations.

Compensation:

$$x_0 = x_i + \sum_k a_k (t - t_0)^k$$

Conversion:

$$x_0 = a_k x_i^k$$

FIG. 12 shows how the raw sensor data may be taken to result in a displayed "hitch weight."

The graph in FIG. 13 shows the sensor signal to weight.

The graph in FIG. 14 shows the raw signal versus corrected signal with varied weights. The sensor detects the physical force transferred from the hitch. It is measured by an analog-to-digital converter (ADC) in the measurement block. The output of the measurement block is the raw uncompensated data, as shown above.

In the Compensation block the drift is corrected using the formula shown, where $x_i$ is the input signal, $x_o$ is the output signal, and they $a_k$'s are coefficients determined during the two calibration steps. At the output of this block, the signal is as represented by the red trace in the graph above.

In the Conversion block the signal is converted from units of millivolts to units of pounds or kg using the formula shown. Again $x_i$ is the input signal, $x_o$ is the output signal, and they $a_k$'s are coefficients determined now during only the user calibration. The scope of these variable names is local to the block, i.e. the $a_k$'s here are not the same as the ones in the compensation block. The output value $x_o$ here is what is displayed on the smartphone app (or other user interface).

The geometry of the "ball support" plays the most influential role in determining the force being applied into a vehicle's hitch system.

For example;

1) the length of the ball support (or mount) that is inserted horizontal into the vehicle's receiver tube from the end, changes the force applied at the point of contact between the two. Point of contact occurs inside near the end of the vehicle's receiver tube.

2) in the opposite direction, the horizontal distance from the end of the vehicle's hitch tube to the center of the "ball" dramatically changes the force applied at the point of contact between the two.

These two factors seem to mandate that prior art trailer tongue weighing systems must maintain these two factors in order to calculate accurate weight determinations.

Applicant's system doesn't have to control these two factors because of the sandwiched position of the sensor and by having a User calibration system that is performed before every use. It is quick, easy and automatically takes into consideration all of the real-time influences of changing geometry that is inherit in the many ball supports of the market place. This has never been available to the market place to date. This allows the user of the inventive system the exclusive ability to use all makes models and sizes of ball mounts they currently own or may wish to buy in the future.

The graph in FIG. 15 shows the sensor signal versus time at constant weights.

FIGS. 12-15 show that the sensors have drift and nonlinearity in the data which are being corrected for to provide a displayed "hitch weight."

In each form of the invention, the standard trailer hitch and the gooseneck hitch in pickup beds, the load sensors detect the downward weight on the hitch and can display it so the user can act accordingly. If the weight is within limits nothing needs to be done and the user has the assurance that their weight is acceptable. If not, weight can be removed or adjusted on the trailer to decrease the tongue weight.

Another embodiment of the invention is designed to permanently install the load sensor in the hitch receiver tube. In this embodiment, the hitch receiver tube 100 has a bottom surface 102. Below the bottom surface of the hitch receiver tube 102 is a contact block 104, an actuator 106 and an actuator slide 108. The load sensor 110 is arranged on the top of the actuator 106. Actuator 108 is tapered and can slide from right to left, from an unengaged position to an engaged position. As the slide 108 moves to the left, the larger cross-sectional portion raises the actuator 106 and contact block 104 above the bottom surface of the hitch receiver tube 102. When the ball mount is installed into the tube receiver 100, the weight loaded on the ball of the ball mount is transferred to the load sensor, which can determine the weight.

This completes the description of the preferred and alternate embodiments of the invention. Those skilled in the art may recognize other equivalents to the specific embodiment described herein which equivalents are intended to be encompassed by the claims attached hereto.

What is claimed is:

1. A weight sensing vehicle hitch comprising:
  a hitch receiver tube for receiving a ball support;
  a load sensor sandwiched between a contact block and an actuator to support and protect the sensor from damage while in either of two positions, a first position in which the contact block, actuator and load sensor is not in contact with a bottom of the ball support and a second position in which the contact block, actuator and load sensor is raised into contact with the bottom of the ball support, using an actuator slide, to such a height that weight is transferred from the ball support directly to the load sensor which is sandwiched between the contact block and actuator.

2. The weight sensing vehicle hitch of claim 1 wherein the actuator slide is tapered so sliding the actuator slide from the first position to the second position raises the actuator, load sensor, and contact block to a height above the lower interior surface of the hitch receiver tube, so that weight is transferred from the ball support directly to the load sensor which is sandwiched between the contact block and actuator.

3. The weight sensing vehicle hitch of claim 1 wherein the first position allows the load sensor to remain installed in the hitch during periods of non-use.

4. The weight sensing vehicle hitch of claim 3 wherein said mechanism to connect to a source of electrical power is a wiring adapter to fit a standard trailer connector on a vehicle.

5. The weight sensing vehicle hitch of claim 1 further including:
   a mechanism to connect the load sensor to a source of electrical power;
   a computational assembly for determining the weight applied to said load senor; and
   a mechanism to display the weight sensed by the load sensor.

6. The weight sensing vehicle hitch of claim 1 further including:
   a computational assembly operatively connected to the load sensor for calibrating the load sensor to maintain accuracy when ball supports of various geometry and dimensions are used.

* * * * *